United States Patent [19]

Horowitz

[11] 4,106,233

[45] Aug. 15, 1978

[54] IMITATION BARK BOARD FOR THE SUPPORT OF CLIMBING PLANTS

[76] Inventor: Alvin E. Horowitz, 2320 SW. 23rd Ave., Miami, Fla. 33145

[21] Appl. No.: 820,886

[22] Filed: Aug. 1, 1977

[51] Int. Cl.² ............................................. A01G 9/12
[52] U.S. Cl. ........................................ 47/44; 46/25; 47/46; 47/47; 285/330; 403/339
[58] Field of Search ............................. 47/42–47, 47/66; 46/25, 26, 30, 31; 403/339, 329, 377, 393; 285/304, 330

[56] References Cited

U.S. PATENT DOCUMENTS

| 397,732 | 2/1889 | Landis | 47/33 |
|---|---|---|---|
| 657,050 | 8/1900 | Bick et al. | 47/66 X |
| 1,486,705 | 3/1924 | Walker | 47/66 X |
| 2,859,558 | 11/1958 | Hallum | 47/33 X |
| 3,354,580 | 11/1967 | Amortegui | 47/47 |
| 3,951,294 | 4/1976 | Wilson | 47/33 X |
| 4,022,436 | 5/1977 | Thomas | 47/47 X |

FOREIGN PATENT DOCUMENTS

| 897,966 | 4/1972 | Canada | 47/47 |
|---|---|---|---|
| 1,565,562 | 3/1969 | France | 285/330 |
| 1,903,159 | 1/1969 | Fed. Rep. of Germany | 46/31 |
| 2,344,221 | 3/1975 | Fed. Rep. of Germany | 47/47 |
| 2,356,930 | 5/1975 | Fed. Rep. of Germany | 46/30 |
| 1,382,134 | 1/1975 | United Kingdom | 46/25 |

*Primary Examiner*—Edgar S. Burr
*Assistant Examiner*—Steven A. Bratlie
*Attorney, Agent, or Firm*—Ernest H. Schmidt

[57] ABSTRACT

An elongated, integrally-formed member simulating natural wood bark along one surface is provided with snap-fit interlock means for interconnecting, both longitudinally and laterally, with one or more like members for selectively increasing length and/or cross-sectional size to best accommodate the height and size of one or more vine or vinelike climbing plants to be supported. Each member is of arcuate cross-sectional shape to simulate natural wood bark board strips, and is adapted to lateral inter-fitting connection with one, two or three additional members for selective increase in cross-sectional size as required.

1 Claim, 10 Drawing Figures

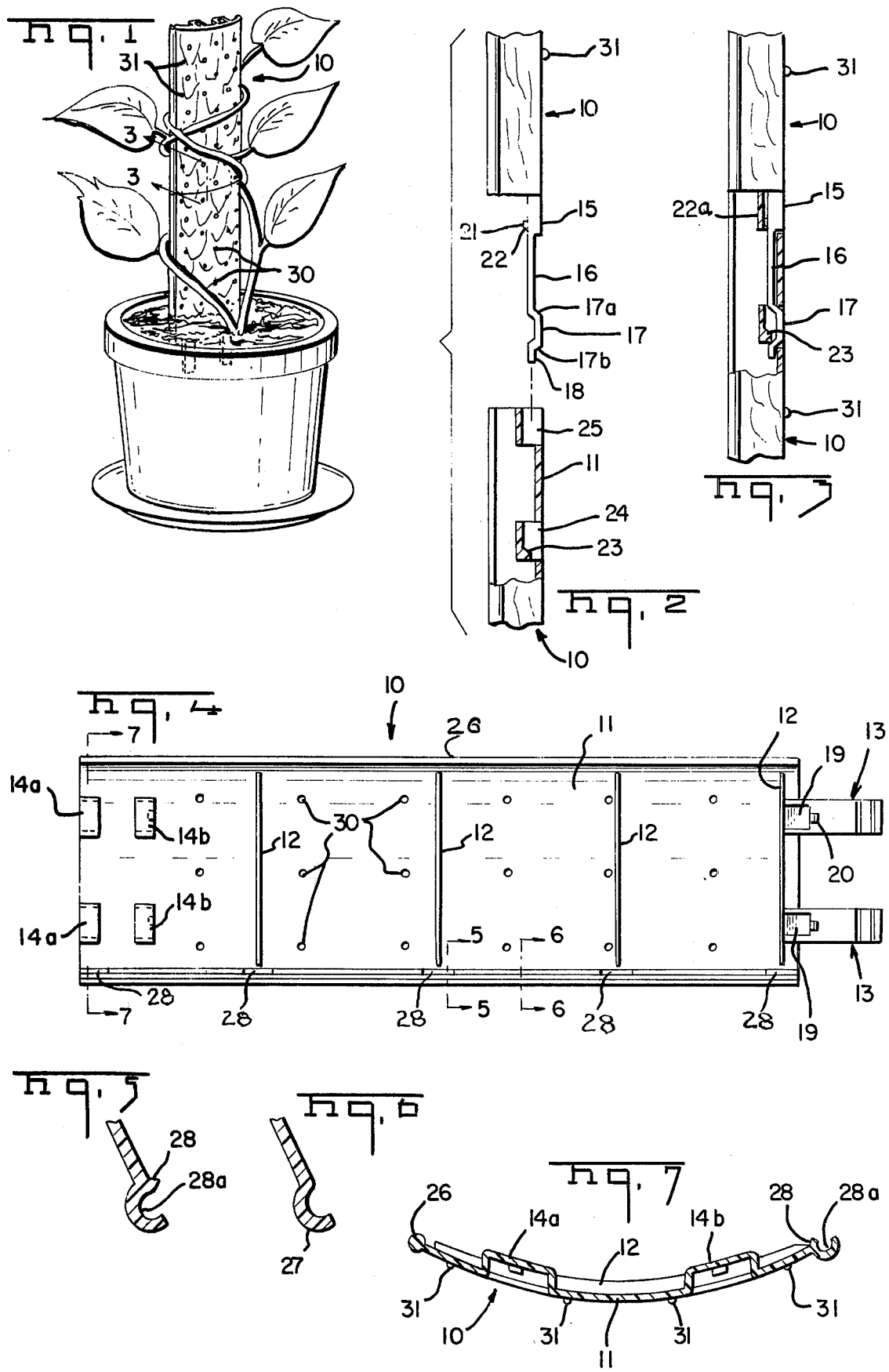

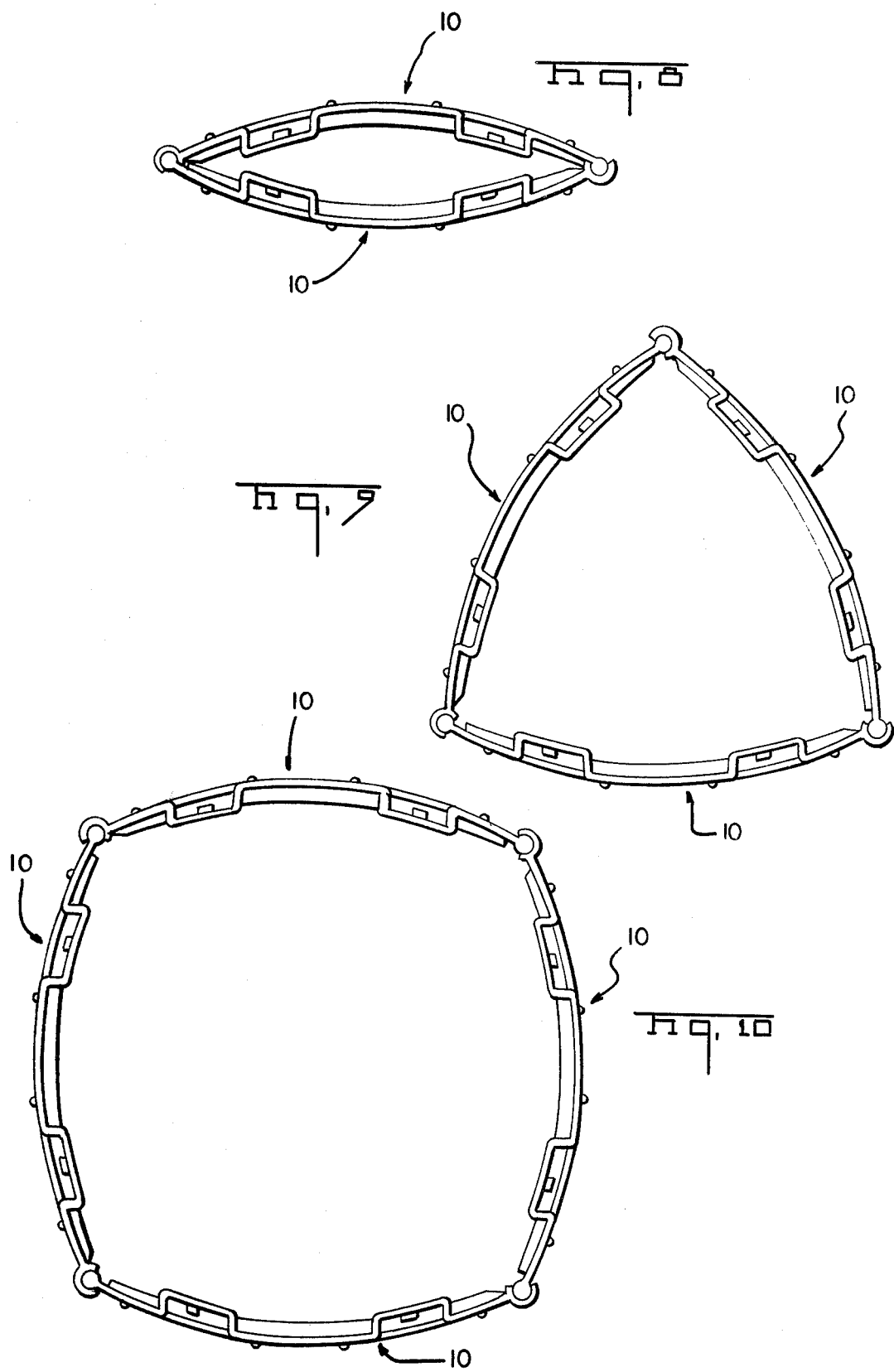

IMITATION BARK BOARD FOR THE SUPPORT OF CLIMBING PLANTS

This invention is directed to ornamental plants and is directed particularly to an imitation bark board for use in the support for attractive display of climbing vines and vine-like plants.

The use of thin sections natural bark board strips for the support of potted climbing vines and the like is known. The rough bark surfaces of such supporting bark boards provide protuberances and the like about which the tendrils of the climbing vines anchor themselves as the plant grows. The natural appearance of the wood bark, moreover, enhances the beauty of the plant, particularly when potted for indoor use.

The principal disadvantage of using such natural bark board strips for support of climbing vines and the like is that their length cannot conveniently be increased to accommodate excess growth of the plant. Another disadvantage is that natural bark boards, because of their great weight in the larger sizes, are not suitable for use in the support of heavy vine-like plants or a plurality of such heavy plants arranged for display in a large container.

It is, accordingly, the principal object of this invention to provide an imitation bark board device for the support of potted vines and the like, that can be extended in length to accommodate vertical growth of the plant, while at the same time being selectively adaptable to increase in cross-sectional shape to provide for the support of heavier and/or multiple climbing plants.

Another object of the invention is to provide an imitation bark board device of the character described which can conveniently and inexpensively be fabricated of a synthetic plastic material by the use of injection molding techniques, and which will closely simulate natural wood bark in external appearance.

Other objects, features and advantages of the invention will be apparent from the following description when read with reference to the accompanying drawings. In the drawings, wherein like reference numerals denote corresponding parts throughout the several views:

FIG. 1 illustrates, in perspective, an imitation bark board embodying the invention shown in use supporting a potted climbing vine plant;

FIG. 2 is a fragmentary elevational view, with portions broken away, of interconnecting end portions of a pair of the imitation bark boards to be assembled end to end for length extension;

FIG. 3 is an elevational view similar to that of FIG. 2, but illustrating the two imitation bark boards in end to end interconnected relation;

FIG. 4 is an inside plan view of one of the imitation bark board members, shown separately;

FIG. 5 is a partial, transverse cross-sectional view, taken along with the line 5—5 of FIG. 4 in the direction of the arrows;

FIG. 6 is a partial, transverse cross-sectional view, taken along with the line 6—6 of FIG. 4 in the direction of the arrows;

FIG. 7 is a transverse, cross-sectional view, taken along the line 7—7 of FIG. 4 in the direction of the arrows;

FIG. 8 is an end view illustrating how two of the imitation bark board members can be interfitted along each side to provide a composite support member having a finished appearance at both front and back;

FIG. 9 illustrates how three of the imitation bark board members can be interconnected along their sides in a generally triangular cross-sectional configuration to provide for greater rigidity in the support of heavier or multiple climbing vines; and FIG. 10 illustrates how four of the imitation bark board members can be similarly interconnected for even greater cross-sectional size.

Referring now in detail to the drawings, reference numeral 10 designates, generally, a preferred form of imitation bark board embodying my invention, said bark board being integrally molded of a tough, synthetic plastic material of dark brown color to simulate the appearance of natural wood bark. As best illustrated in FIGS. 4 and 7, the bark board 10 comprises an elongated, rectangular, thin-walled body portion 11 of arcuate cross-sectional shape. The body portion 11 may be formed at the inside with a plurality of spaced, transversely-extending ribs 12 for strengthening purposes.

Means is provided for interjoining two or more individual imitation bark board members 10 in secure, end-to-end relation for extending the length to accommodate tall-growing vines. For this purpose, one end of the body portion 11 has integrally molded therewith a pair of symmetrically spaced, outwardly-projecting prong members 13, and the other end of said body portion is formed with similarly laterally spaced socket means 14a, 14b and 14a, 14b for the interfitting reception of prongs 13, respectively, of the next successive imitation bark board member 10 to be joined.

Each of the prong members 13 is rectangular in peripheral shape and, as best illustrated in FIGS. 2 and 4, is formed along the outside with a first section 15 the outer surface of which lies substantially in the same plane as that of the outside of the bark board body portion 11. The first section 15 of the prong member 13 extends into a comparatively long, recessed section 16 which, in turn, extends into a comparatively short, outwardly offset section 17 which terminates in a tip portion 18 which lies in substantially the same plane as that of said recessed section. With further reference to FIG. 2, it is to be noted that the merging end portions of the offset sections 17 are defined by inclined surface portions 17a, 17b, for the purpose hereinafter appearing. As further illustrated in FIGS. 2 and 4, the insides of the spaced prong members 13, near the inner ends thereof, are formed wth rectangular recesses 19 which, at their outer ends, merge with a centrally-located, outwardly-projecting slide abutment portion 20. As best illustrated in FIG. 2, the slide abutment portion 20 is formed with a flattened tip portion 21 and a beveled leading surface portion 22.

As can be seen in FIGS. 2, 4 and 7, each of the longitudinally-aligned socket pairs 14a, 14b comprises a substantially rectangular, inwardly-offset portion 22a integrally molded with respect to the body portion 11 of the imitation bark board 10, of such size and so positioned as to admit the corresponding prong member 13 of an identical bark board member to be interconnectingly added. Each of the inner socket portions 14b is formed, at the inside and at the inner end thereof, with a central, beveled slide projection 23.

Referring now particularly to FIGS. 2 and 3, and considering the operation of the interconnecting mechanism, it will be seen that as the prongs 13 of an imitation bark board member 10 to be added are plugged into the respective socket portions 14a, 14b of the imitation bark board to be joined to, the prong tip portions 18 will ride up the socket slide projections 23 to snap the offset sections 17 in seating engagement within the respective rectangular through openings 24 defined by offset socket portions 14b. At the same time, the first section 15 of each of the prong members 13 will seat within the rectangular opening 25 defined by respective socket portions 14a so that the interconnecting joint, when viewed from the outside, will be inconspicuous. The slot abutment portions 21 of the prong members 13, upon such interfitting engagement, will slide along the inner surfaces of the socket portions 14a for enhancing the frictional grip between the thus assembled imitation bark board members. Separation can be achieved simply by pulling the members apart to disengage the outwardly offset sections 17, it being understood that the resilient nature of the synthetic plastic material of which the imitation bark board members 10 are fabricated will permit such flexure as is required for interfitting engagement and disengagement. In this connection, the inclined surface areas defined by surface portions 17b of the prong offset sections 17 provide cam-like action preventing interhooking engagement, and thereby permit snap-like interfit, releasable by relative pulling apart of the imitation bark board members as described above.

Means is also provided for interjoining two or more of the imitation bark board members 10 along their side edges for modifying cross-sectional shape and appearance. To this end, as illustrated in FIGS. 4 through 9, the imitation bark board body portion 11 is formed along one side with a circular bead 26, and along the other side with a generally U-shaped, co-extensive receptacle 27 defining, along its length, a recess of semi-circular, cross-sectional configuration for the loose interfitting reception of the circular bead of another imitation bark board 10, as is hereinafter more particularly described. As best illustrated in FIGS. 4, 5 and 7, the inner ends of the U-shaped receptacle 27 are provided, at each end of the imitation bark board member body portion 11 and at spaced intermediate portions therealong, with arcuate extension portions 28 defining, with the internal semi-circular recess of said U-shaped receptacle, circular socket portions 28a of somewhat greater than 180 circular degrees extent, thereby providing for inter-snapping fit of the circular bead portion 26 of an imitation bark board member 10 to be added. In this connection, it is to be understood that the circular cross-sections of the circular bead portions 26 and the U-shaped receptacle portions 27 will be of substantially the same diameter, to provide for an embracing, snap-like interfit. Thus, as illustrated in FIG. 8, two of the imitation bark board members 10 can be snap-fitted together, with the insides face-to-face to provide a bark board assembly which not only will have greater rigidity, but which also will present a finished appearance from each side.

FIG. 9 illustrates how three of the imitation bark board members can be interfitted along side edges to provide a bark board assembly of a generally triangular shape for use in the support of heavy or multiple climbing vines. It will be understood, of course, that a plurality of the imitation bark board members 10 can be assembled both longitudinally and laterally, as described above, in various combinations to suit the needs of the vine or vines to be supported.

FIG. 10 illustrates how four of the imitation bark board members can be interfitted to provide an assembly of substantionally square cross-sectional shape of even greater size.

As best illustrated in FIG. 1, the outer surface of the imitation bark board member 10 will be three-dimensionally textured to simulate the appearance of natural bark. A plurality of uniformly spaced through openings 30 in the imitation bark board body portion 11 serve as anchor means, along with rough surface projecting portions of the simulated bark outer surface, for the climbing vine tendrils.

As additional anchoring means, the body portion 11 is formed with a plurality of uniformly spaced projections or portrusions 31 about which the tendrils can wind.

It will further be noted, with reference particularly to FIG. 1 of the drawings, that the axially-outward-projecting prongs 13 of the lowermost imitation bark board member 10 serve as anchoring means for enhancing support thereof in the soil of the potted vine.

While I have illustrated and described herein only one form in which my invention can conveniently be embodied and practiced, it is to be understood that this embodiment is presented by way of example only and not in a limiting sense. The invention, in brief, comprises all the embodiments and modifications coming within the scope and spirit of the following claims.

What I claim as new and desire to secure by Letters patent is:

1. An imitation bark board member for the support of climbing ornamental plants and the like comprising, in combination, an integrally formed, elongated, substantially rectangular body portion, one side of said body portion having a three-dimensional surface texture simulating the texture of natural wood bark, and interlock means for removably interfittingly connecting a plurality of the imitation bark board members in end-to-end relation, said interlock means comprising a pair of prongs extending outwardly of one end of said body portion and a pair of sockets at the other end of said body portion, said prongs of one of the bark board members being receivable one each in the sockets of another bark board member, means for removably interconnecting a plurality of the bark board members along abutting longitudinal edge portions thereof, said longitudinal edge interconnecting means comprising a circular bead formed along one edge of said body portion and a recess of semi-circular cross-sectional configuration formed along the other longitudinal edge of said body portion, said body portion being of arcuate transverse cross-sectional shape and formed with a plurality of uniformly spaced, circular protuberances serving as anchoring means for the tendrils of climbing plants, said recess of semi-circular cross-sectional configuration being open to the other side of said substantially rectangular body portion to permit a pair of the bark board members to be interconnected back-to-back along their opposing longitudinal edge portions.

* * * * *